July 10, 1945.  R. G. JEWELL  2,380,242
TELEMETERING SYSTEM AND APPARATUS
Filed Feb. 25, 1944   3 Sheets-Sheet 1

Inventor:
Richard G. Jewell,
by Harry E. Dunham
His Attorney.

July 10, 1945.   R. G. JEWELL   2,380,242
TELEMETERING SYSTEM AND APPARATUS
Filed Feb. 25, 1944   3 Sheets-Sheet 2

Inventor:
Richard G. Jewell,
by Harry E. Dunham
His Attorney.

July 10, 1945.    R. G. JEWELL    2,380,242
TELEMETERING SYSTEM AND APPARATUS
Filed Feb. 25, 1944    3 Sheets-Sheet 3

Inventor:
Richard G. Jewell,
by Harry E. Dunlap
His Attorney.

Patented July 10, 1945

2,380,242

UNITED STATES PATENT OFFICE 2,380,242

TELEMETERING SYSTEM AND APPARATUS

Richard G. Jewell, Swampscott, Mass., assignor to General Electric Company, a corporation of New York Application February 25, 1944, Serial No. 523,835

15 Claims. (Cl. 177—351)

My invention relates to a telemetering system and apparatus. An important object of my invention is to provide a telemetering system utilizing an electrical transmitter which requires no bearings or sliding contacts or make and break contacts, or electronic contacts. For instance, the system may be employed to indicate pressure variations at a remote point and the pressure transmitter may be mounted directly on an engine or other part subject to vibration without the necessity of using a shockproof mounting. Another object of my invention is to provide a system in which a small linear movement in the transmitter may be reproduced at the receiver as a large angular deflection with high accuracy and with the use of a minimum number of conductors between transmitter and receiver. A further object of my invention is to provide a receiver for use in such a system having various novel features, including means for producing a distinctive offscale indication in case the transmitting channel between the transmitter and receiver is broken, in case the channel becomes grounded, or in case of total power failure. In carrying my invention into effect, I employ stationary, alternating current energized, saturable magnetic core elements at transmitter and receiver cooperating with small permanent magnets, certain ones of which are movable, and constitute the movable elements in transmitter and receiver, utilizing a unique principle.

The features of my invention which are believed to be novel and patentable will be pointed out in the claims appended hereto. For a better understanding of my invention, reference is made in the following description to the accompanying drawings in which

Figures 1, 2:
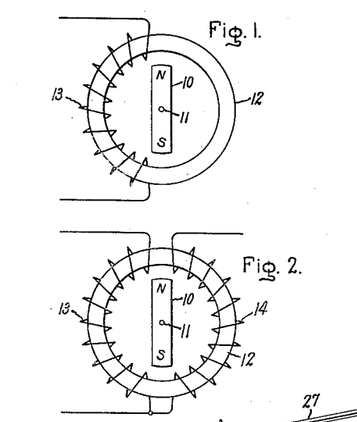
Figs. 1 to 3 represent simple alternating current magnets and permanent magnet rotor devices which will be referred to in explaining principles employed in my invention.
Figure 3:
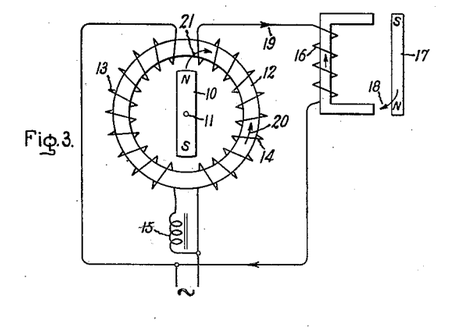

To assist in an understanding of the operation of the apparatus to be described, it is desirable to understand two characteristics of the behavior of a permanent magnet suspended so that it is free to turn in an annular stator core excited by alternating current as represented in Figs. 1 to 3. In Fig. 1, 10 represents a small bar permanent magnet pivoted at its center 11 in the center of an annular stationary magnetic core 12 having a winding 13 on one-half thereof. The flux axis of the magnet is diametrical of the annular core. If an alternating current voltage is impressed on the winding and the core excited to near the saturation value, the core will rotate to the position shown in Fig. 1, although no preference for magnetic polarity is evident, and the magnet may assume the vertical position but in the reverse direction. The reason for this behavior is that the magnet 10 seeks a position where the reluctance of its magnetic circuit is a minimum. The core 12 forms the return path of flux of magnet 10 and when alternating current is impressed on the winding 13, as above mentioned, the resulting A.-C. flux tends to saturate the core 12 and makes the reluctance of the permanent magnet return flux path high. However, due to leakage of the A.-C. flux under saturated core conditions, the reluctance of the return flux path of the permanent magnet is greatest in that half of the core covered by the winding 13 and least in the other half where there is no winding. Hence, the magnet turns so as to make the right-hand or unwound side of the core 12 its major return flux path.

A second characteristic is explained in connection with Fig. 2, where a second winding 14 has been added to the arrangement of Fig. 1 on the other half of the core. If both windings are excited with equal ampere turns by alternating current, sending flux in the same direction about the core at any instant, the rotary magnet 10 will assume any position because then all parts of the core present a uniform reluctance. However, if one coil has more ampere turns than the other, we arrive again at the condition of Fig. 1. If, now, with the arrangement of Fig. 2, the ampere turns in coil 14 could be increased above that in coil 13 during one-half cycle and yet have the ampere turns in coil 14 equal or less than that of coil 13 for the reverse half-cycle, then the magnet 10 will seek the vertical position shown and will have a polarity preference where its flux combined with the A.-C. fluxes produces the least average saturation. Such an arrangement is shown in Fig. 3 where the reactance devices 15 and 16 are connected in series with the similar coils 13 and 14, respectively, and the two circuits connected in parallel across an A.-C. supply source. Assume that the alternating currents in coils 13 and 14 are equal in both directions when a permanent magnet 17 is not present. Reactance 16 may have its core saturation increased for one direction of current and decreased for the opposite direction of current by bringing the permanent magnet 17 close thereto as represented. This increases the current through coil 12 during the half-cycle when the core of reactance 16 is more completely saturated, and decreases it for the reverse half-cycle. In Fig. 3 let the arrow 18 represent the direction of flux produced by magnet 17. Then when the current in reactance coil 16 is in a direction to produce flux in the same direction through its core, the effective reactance thereof will have the reduced value and the increased current will flow which may be represented by the arrow 19. Assume that this current flowing in coil 14 produces a flux in core 12 having the direction indicated by the arrow 20. Rotor magnet 10 will therefore place itself in a position so that its flux, represented by arrow 21, tends to reduce flux 20 as shown. In other words, magnet 10 will take a position which produces the least saturation of core 12, if any condition exists where this is possible. If magnet 17 is now reversed, magnet 10 will also reverse, and the reversing torque developed in rotor magnet 10 will depend upon the amount of flux produced in the reactance 16 by the permanent magnet 17. Thus, this torque can be decreased and increased by moving magnet 17 away and toward the core of 16. In general, two such torque producing arrangements, modified to adapt the same to telemetering, are used in my invention.

Figure 4:
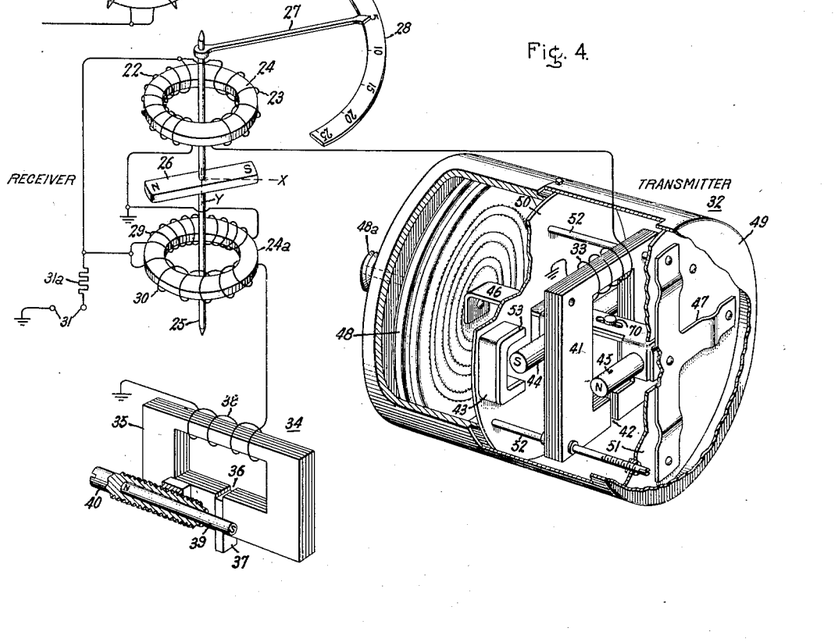
Fig. 4 represents the principal electrical and magnetic features of my invention as used in a remote indicating pressure gauge.

In Fig. 4, there is represented a receiver having a rotary shaft 25 on which is mounted a bar-shaped permanent magnet armature 26 and a pointer 27 which cooperates with a scale 28. Upper and lower stator elements are provided, the upper stator element having an annular core 24 of saturable magnetic material having coils 22 and 23 wound on opposite halves thereof. The lower stator element is essentially similar, with an annular core 24a of saturable magnetic material on the opposite halves of which are wound the coils 29 and 30. The coils of each core are wound and energized with alternating current to produce fluxes about the core in the same direction at any instant. The axes of the coils on the two stators are at approximately right angles to each other and both are close to, and cooperate with, the polarized armature magnet 26. The several windings are connected in parallel circuits and all energized by a constant frequency, constant voltage source 31. The upper stator with the armature 26 may be considered to be equivalent to the receiver part of Fig. 3, except that the fixed reactance 15 of Fig. 3 is included in the winding 22. At 32 is a pressure transmitter which corresponds generally to the variable reactance 16—17 of Fig. 3, and the coil 33 of which is connected in series with coil 23 of the receiver. The transmitter functions to vary the current in coil 23 so that the upper stator element will produce a torque on rotor 26 tending to line it up with the axis of the coil 23, or axis Y, at times in one polarity direction and at other times in the opposite polarity direction, and to vary the magnitude of this torque in response to pressure changes. Thus the torque of the upper element tends to move the pointer off one or the other end of the scale 28 which has an arc of about 100 degrees.

The lower stator element of the receiver acting with armature 26 is also generally similar to the receiver element of Fig. 3, with the reactance 15 included in the winding 29 and with a fixed temperature compensating and calibrating reactance 34 in series with winding 30 which may be considered to correspond generally to the reactance 16—17 of Fig. 3, except that the reactance 34 is intended to remain substantially constant both as to magnitude and polarity direction, and it may be termed a fixed vector generator. The function of the lower stator is to produce a substantially fixed torque on rotor 26 of the receiver, tending to align it with the axis of coils 29—30, or axis X, at substantially right angles to axis Y, and always with a fixed polarity such as to tend to cause the pointer 27 to indicate near the center of the scale 28. The resultant pointer deflection is produced by the joint torques of the upper and lower stator elements acting on the rotor 26, and is such as to produce an indicating deflection calibrated in terms of the quantity under measurement, which, in this case, is pressure but which could be any other desired quantity capable of being translated into a transmitter movement.

In the receiver illustrated a single armature cooperates with two cores, which is the preferred arrangement. However, I could provide all of the windings described on a single core, and it is also possible to have a single core with two armatures.

The fixed vector generator reactance 34 comprises a core 35 of high permeability magnetic material containing a gap 36, in which there is inserted a piece of magnetic material 37 having a negative temperature coefficient of permeability for temperature compensation. On the core is a coil 38 connected in series with coil 30 of the receiver. A unidirectional flux is produced in the core by a permanent magnet 39 contained in a nonmagnetic screw 40 and fastened to the side of the core 35 adjacent the gap 36 so that the magnitude of the unidirectional flux from magnet 39 which threads core 35 may be nicely adjusted. Moving the magnet to the left of the position shown decreases its effect, and moving it to the right more toward the center of the core and bridging the gap 36 increases its effect. The magnet 39 thus reduces the reactance of this device and increases the current in coil 30 of the receiver during one-half cycle and produces the opposite effect during the reverse half-cycle. The polarity effect is in a direction to tend to cause the pointer 27 to move near the center of the scale 28 and if it should happen to be the reverse of this when initially connected up, it may be corrected by reversing coils 29 and 30, or coil 38, or the magnet 39.

Figure 7:
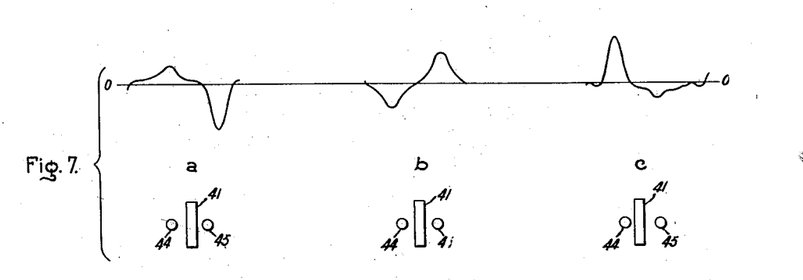
Fig. 7 represents the manner in which the alternating current is varied for different permanent magnet positions in the transmitter.

The transmitter 32 includes a reactance which is variable both as to vector or polarity direction and as to magnitude. It has a magnetic core 41 on which the coil 33 is wound. The core has a gap 42 therein. For varying the magnitude and direction of the unidirectional flux threading the core, there is provided a pair of permanent magnets 44 and 45 extending parallel with the coil 33 on either side of the core adjacent to and across the gap 42 and mounted on a movable armature support 46 which extends between a resilient diaphragmlike support 47 and the movable diaphragm end of a resilient bellows 48 which responds to the pressure to be measured. When the pressure in bellows 48 increases, the support 46 moves endwise to the right, being resisted by the spring support 47, and when the pressure decreases, the reverse movement occurs so that the position of the support 46 and the permanent magnets 44 and 45 carried thereby varies with the pressure changes. It is noted that the magnets 44 and 45 are mounted so that their polarities are reversed with respect to each other. Hence, when magnet 44 is brought closest to the core 41, unidirectional flux is produced in the core 41 and coil 33 in one direction, and when the other magnet 45 is brought closest to the core, it produces a unidirectional flux in the opposite direction through the core 41 and coil 33. When the magnets are substantially equally distant from the core, no resultant unidirectional flux is produced in the core 41. Thus, I have provided means responsive to a small linear movement of the member 46 caused by pressure changes for varying the direction and the magnitude of the unidirectional flux which is caused to flow in the alternating current reactance comprising the core 41 and coil 33. This, in turn, causes a variation in the alternating current flowing in coil 33 of the transmitter and the coil 23 of the receiver in a manner somewhat as represented in Fig. 7, for varying positions of the magnets 44 and 45 relative to the core 41. In Fig. 7 when the magnets are symmetrical with respect to the core, the two half-cycles of the alternating current I are equal somewhat as shown at $b$. When the magnets are displaced in one direction, the peak of the positive half-cycles is small as compared to those of the negative half-cycles as shown at $a$; and when the magnets are displaced in the opposite direction, the peak of the positive half-cycles of the current is large as compared to those of the negative half-cycles as shown at $c$. In Fig. 7 the straight horizontal line 0—0 represents zero current value.

Figure 8C:
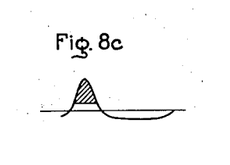
Figs. 8c and 9c represent cycles of current in the transmitter current for the same position of the transmitter as that of Fig. 7c but with different values of voltage excitation.
Figure 9C:
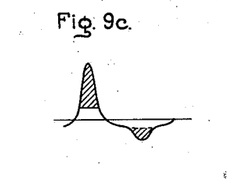

Fig. 8c represents the positive and negative half-cycles of the current in coil 33 when the magnets 44 and 45 are positioned as at Fig. 7c, but where the excitation voltage on the system is lower than in Fig. 7. Fig. 9c represents the same current conditions except that the excitation voltage on the system is higher than in Fig. 7. I have found that the positive and negative half-loops are of equal area under the three degrees of excitation, but that the peaks of the current loops caused by saturation vary in height. Thus, in Fig. 8c the peak of the positive half-loop indicates saturation during that half-cycle in the core 41 but the negative half-peak is fairly flat and has no noticeable peak, indicating no saturation during this portion of the cycle. In Fig. 9c, with higher excitation voltage, both the positive and negative half-cycles have a saturation peak or hump, indicating that some saturation is now occurring during the negative half-cycle. These saturation humps are roughly indicated by the shaded areas of the loops. I have found that the difference between the saturation humps of the positive and negative half-cycles remains constant even though the excitation voltage varies, and that it is this difference which produces the corresponding torque in the receiver. If the excitation voltage is so low that the core material is below saturation during the negative half-cycle, as here considered, there is a voltage error because then during the positive half-cycle the torque-producing saturation hump varies with excitation voltage, and this variation is not offset by any saturation hump in the negative half-cycle. Hence, it is desirable to have the excitation voltage high enough so that if there is a variation, it will not change the resultant torque. The torque in the receiver resulting from the positive half-cycle saturation hump is in one direction and the torque in the receiver resulting from the negative half-cycle hump is in the reverse direction, and the resultant torque is their difference which is practically constant for a given position of the magnets 44 and 45, even though the excitation may vary somewhat if the excitation voltage is sufficient to produce some saturation during the negative half-cycle in the example explained. Thus, the apparatus has no appreciable voltage error. It is noted from Fig. 7b that both the positive and negative half-cycles have saturation humps, but that they are equal and no resultant torque results.

It is further noted that the resultant torque is in the nature of pulses occurring at the middle of the positive half-cycle loop in the case considered. This is advantageous as it tends to overcome slight bearing friction that might not be overcome if the same integrated value of resultant torque were spread out over the complete cycle.

The currents in coils 22 and 23 of the receiver are so adjusted that when there is no resultant difference in saturation of the positive and negative half-cycles in the current of coil 23 (position $b$, Fig. 7), they produce identical fluxes in their respective halves of the core 24, and hence, this stator element then produces no torque on armature 26, and its position is then controlled by the lower stator having the core 24a and coils 29 and 30, and the result is that the armature is positioned so that the pointer 27 is at or near midscale. When the resultant saturation (Fig. 7a) of core 41 is in one direction, the armature 26 has a resultant torque tending to turn it to the Y axis position with the S pole thereof away from the observer as viewed in Fig. 4, and the magnitude of this torque depends upon the position of the magnets 44 and 45 relative to core 41 and the pressure applied to the bellows 48. The armature is then acted upon by the counterclockwise torque just described and the clockwise torque produced by the fixed vector generator 34 in the lower stator element having the core 24a. When the pressure being measured has a zero value, the fixed vector torque in relation to the variable torque and other conditions are adjusted such that the pointer 27 indicates zero on the scale 28. Then for increasing pressures, the variable counterclockwise torque becomes less and the pointer 27 moves upscale. When the pressure increases beyond the value where resultant torque due to the transmitter becomes zero (Fig. 7b) this torque reverses and a clockwise torque occurs between armature 26 and the upper stator element, which torque also opposes the fixed vector torque of the lower element of the receiver because now the armature has rotated clockwise beyond the midscale position and the pointer is in the upscale range where fixed vector torque is counterclockwise. The position of the pointer is again determined by the resultant of the opposing torques, and at maximum pressure for which the apparatus is designed the pointer indicates at the upper end of the scale. The scale length cannot be 180 degrees, but satisfactory deflection characteristics for a scale length of about 100 degrees are obtained. Preferably, provision is made, as indicated at 70, Fig.

4, for adjusting the distance between the magnets 44 and 45 in the receiver to adjust the scale length and, in particular, the upper end of the scale length. It is not essential that variable torque produced in the upper stator element reverse at the zero torque axis X of the lower stator element, although this is the case when the axes of the coils of the two stator elements are displaced 90 degrees; and I wish now to describe a preferred condition of adjustment of the coil positions which may be utilized always to move the pointer 27 offscale in case the circuit between transmitter and receiver is broken, thus preventing a false indication.

It is evident that if the circuit of coil 23 were interrupted and the remaining coils of the receiver remained energized, the coil 22 would produce a torque on the armature 26 tending to move it in line with the Y axis, although this torque has no preference as to polarity as was explained in connection with Fig. 1. Hence, this would tend to pull the pointer offscale, off the lower end if the circuit were broken when the instrument pointer was below midscale position, and off the upper end of the scale if the pointer was above a midscale position. Suppose, however, the accident occurred when the armature was at exactly right angles to the Y axis. The pull-off torque mentioned is unstable at this point because it is equal in the opposite directions. If the X and Y axes are exactly 90 degrees from each other, the fixed vector torque is zero at this point, and in such case the pointer would remain at this midscale position, giving an indication that could be mistaken for a real one. To prevent this, the X axis may be displaced slightly from the 90-degree relation, a few degrees being sufficient, so that if the telemetering circuit were broken when the armature was exactly at right angles to the Y axis, the fixed vector torque would swing the armature toward the zero fixed vector torque position whereupon the pull-off torque mentioned would become effective and if sufficient will move the pointer offscale. The fixed vector generator 34 will ordinarily be located with the receiver so that the only circuit likely to be broken is the telemetering circuit between transmitter and receiver. In order to move the pointer offscale in case the wire between transmitter and receiver becomes grounded, I provide the resistance 31a in the ungrounded supply of all coils of the system. If a ground occurs on the telemetering wire between transmitter and receiver, the current in coil 23 necessarily increases substantially and produces an offscale torque in the Y axis of the receiver. At the same time the increased current flow in resistance 31a decreases the voltage on and the current through the other coils, and hence, the torque of the lower stator element, X axis torque, decreases. Hence, the pointer 27 moves offscale and does not give a false indication.

Referring again to the transmitter 32, the transmitting apparatus is contained in a casing 49 and the casing part surrounding the transmitting reactance 41 is preferably of magnetic material. The partitions 50 and 51 are of magnetic material, and serve for shielding and supporting the reactance. Rods 52 extend through the corners of the core and through the partitions 50 and 51, and for initial calibration purposes the core may be adjusted as to its exact position between the partitions and relative to the magnets 44 and 45 by movement along the rods. When either the magnet 44 or 45 is moved away from the core part 41, such magnet is moved closer to the adjacent magnetic partition and the partition shunts a portion of the flux of such magnet, which increases the sensitivity of the transmitter because it augments the flux changes in core 41, previously explained.

The pressure, which may be either a liquid or gaseous pressure, is piped to the bellows through a pipe coupling at 48a into that end of the bellows which is fixed with respect to the casing 49. This leaves the rear end of the bellows free to expand and contract and move the magnets 44 and 45 accordingly. The near side of the bellows is subject to atmospheric pressure so that differential pressures, one being the atmospheric pressure, are measured. In case differential pressures both being different from atmospheric pressure are to be measured, a second bellows may be mounted in the near end of the casing with its flexible end secured to rod 46, taking the place of spring 47 or the case 49 can be made pressure tight and the second pressure can be applied external to the bellows 48.

The core parts 24, 24a, 35 and 41 are preferably made of laminated mu metal or some other high permeability material which saturates at a relatively low flux density. Those portions of the cores 35 and 41 on which the coils 38 and 33 are wound are of smaller cross section than the remaining portions so as to saturate readily. The permanent magnets 26, 39, 44 and 45 are high-grade permanent magnets and may be made as described in United States Patent No. 2,295,082 to Jonas.

*Temperature compensation*

Whether temperature compensation is desirable and the extent to which it is used depend upon circumstances. The temperature compensation to be described is suitable where extreme temperature changes are to be expected, such as encountered on aircraft. Changes in the temperature of the various coils, cores and armature of the receiver produce negligible error. If the fixed vector generator 34 were located in the same case as the transmitter 32 so that these devices would always be subject to the same temperature, the system would be practicably self-compensating. This would require the running of another wire between transmitter and receiver, and is not always desirable, and the compensation to be described assumes that the fixed vector generator and transmitter are located at different points and are subject to different temperature variations. Changes in the temperature of core 35 and the associated magnet 39 of the fixed vector generator will cause error unless compensation is employed. Mu metal saturates at a lower flux density with an increase in temperature, and the magnet 39 decreases its flux with an increase in temperature and, as a result, the torque component produced by this unit decreases with rise in temperature and causes the pointer 27 to read lower below the center of the scale and higher above the center of the scale than it otherwise would. To compensate for this error, the piece 37 of a material such as Carpenter steel having a negative temperature coefficient of permeability is placed in the air gap of core 35 in shunting relation to the flux of permanent magnet 39 such that a certain adjustable amount of its flux does not pass through the coil 38 and the small cross section of the core where saturation occurs. As the temperature increases, the part 37 shunts less of the permanent magnet flux and allows more to go through coil 38, thereby compensating for the decreased strength of magnet 39 and the lower saturation density of core 35.

The transmitter has a similar temperature error which could be compensated by a shunt having a negative temperature coefficient of permeability in the gap of core 41 in shunting relation to the unidirectional flux produced by magnets 44 and 45. In addition there is generally a temperature error in the transmitter due to decrease in the elasticity constant of the diaphragm of bellows 48 with increase in temperature. This is partially compensated for by the magnet 44 because this magnet becomes weaker as the temperature rises and must, therefore, be moved closer to the core 41 for the same output, which, of course, is what the diaphragm does when its elastic constant is decreased.

At zero pressure, however, the diaphragm elastic constant has no effect and, therefore, magnet 45 must be compensated by itself. The compensation required varies at different pressure measurement, and additional temperature compensation has been found desirable. Hence, instead of a shunt in the gap of core 41, I provide compensating means for taking care of all types of temperature errors in the transmitter. Secured to each magnetic partition 50 and 51, there are provided two U-shaped compensators, only one of which is shown in Fig. 4. These compensators extend generally around the ends of the magnets 44 and 45, there being a similar compensator about each end of each magnet but spaced therefrom with the magnet ends moving laterally within the U of the compensator. The main portion 43 of each compensator is made of a magnetic material having a negative temperature coefficient of permeability such as carpenter steel, and hence, diverts a portion of the flux of the permanent magnets away from the core 41, and the proportion of such flux so diverted decreases with temperature rise and it varies somewhat, and in a desirable manner, with changes in the position of the magnets. In order to improve the effectiveness of these shunts, which at best have low permeability, there is provided on that side away from the partition 50 on which the shunt is secured, a thin section of high permeability, low hysteresis magnetic material 53. It is evident that the two shunts which surround the ends of the magnet and are fastened to the magnetic partition 50 divert a portion of the flux of magnet 44 through the shunts and magnetic partition 50 away from core 41, and that the flux so diverted decreases with rise in temperature. When the magnets 44 and 45 are in their central positions, the centers of the magnets are approximately in line with the outer sections 53 of their shunts; hence, movement of magnet 44 away from partition 50 decreases the flux thereof which is shunted through partition 50, but of the flux shunted more is influenced by the compensator, and movement of magnet 45 toward partition 51 increases the flux thereof which is shunted through its temperature compensating shunts and partition 51, but of the flux shunted less is influenced by its compensator. The dimensions and positions of these compensating shunts are nicely made to produce the desired temperature compensation for all temperature errors of the transmitter. While I do not wish to be limited to any particular set of dimensions for the different parts of my invention, it may be stated that good results have been obtained using magnets at 39, 44 and 45, 1½ inches long and ⅞ inch in diameter, with other relative dimensions of the fixed vector generator and transmitter parts about as represented in Fig. 4. As thus arranged, a ⅞-inch movement of the transmitter magnets relative to core 41 will produce movement of the pointer over the complete scale in the receiver. The core and winding of the fixed vector generator are made identical to those of the transmitter. Adjustment of the magnet 39 to the right in Fig. 4 has the effect of shortening the angle of deflection of the transmitter by increasing the torque component of this fixed vector generator.

For best results the turns on all cores should be such that with the permanent magnets 26, 39, 44 and 45 removed, the cores will operate at the same alternating flux density and the ratio of resistance to inductance in each circuit should be the same. The windings 22 and 29 of the receiver are preferably wound of smaller wire than all of the remaining windings. Thus, windings 22 and 29 may each consist of 4340 turns of 0.00175-inch copper wire and coils 23 and 30 may each consist of 915 turns of 0.0035-inch copper wire in series with 2090 turns of 0.0035-inch copper wire in coils 33 and 38, respectively. This is for 400-cycle, 26-volt excitation. The cores 24 and 24a of the receiver may each consist of six laminations of 0.010-inch thick washers of ⅞-inch inside diameter and ⅝-inch outside diameter. The armature 26 may consist of two round magnets 0.55 inch long and ⅞ inch in diameter placed adjacent and parallel to each other.

Figures 5, 5A:
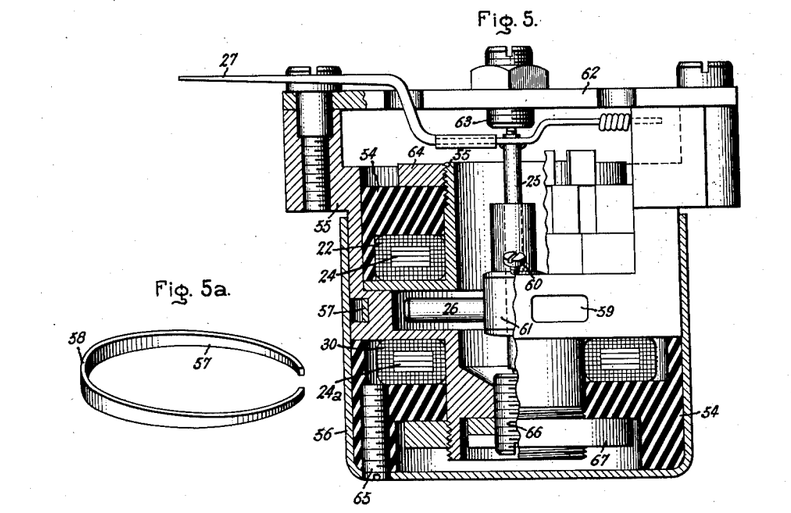
Fig. 5 is a sectional view through a receiver of my invention designed for use on aircraft.
Fig. 5a is a perspective view of a pull-off magnet used in the receiver.

A preferred construction of the receiver is represented in Fig. 5. In this figure the material 54 indicates insulation coil supporting structure. Practically surrounding the armature 26 is a supporting framework structure made of metallic conducting material such as copper alloy indicated by reference character 55. This provides good damping of the armature. The coils, cores and armature with their supporting structure are enclosed in a magnetic cup 56 which provides shielding of the receiver from external magnetic influences. It was previously explained that the receiver could be arranged to provide a pull-off torque in case the transmission circuit between transmitter and receiver was interrupted or grounded. In Fig. 5, I have provided an additional pull-off arrangement consisting of a C-shaped permanent magnet member 57 set in a recess opposite the armature and surrounding the armature 26, and shown separately in perspective in Fig. 5a. This magnet consists of a discontinuous ring of constant thickness but having a depth which tapers both ways from the center 58 toward its open end. It is permanently magnetized at constant flux density in a radial direction with one pole outside and the opposite pole inside of the ring. The discontinuous ring is concentrically positioned with respect to the axis of rotation of the armature and produces repulsion at one end of the armature and attraction at the opposite end of the armature. Since the ring tapers in depth, its flux strength tapers accordingly so that the repulsion and attraction forces cause rotational torques, the attraction torque pulling one end of the armature toward the large part of the ring magnet, and the repulsion torque repelling the other end toward the gap. These torques tend to rotate the armature accordingly to a position where the attraction is strongest and the repulsion weakest, or to a position where the attracted pole of the armature is opposite the large portion of the pull-off magnet. This pull-off torque is substantially uniform over about 160 degrees arc, and the large center portion 58 of the pull-off magnet 57 is placed so as to tend to pull the armature to an offscale position and to provide a pull-off torque which is substantially uniform at all points of the scale. This pull-off torque supplemented by the pull-off torque produced by coil 22 when energized alone, as previously explained, causes the pointer always to move to an offscale position when the circuit of coil 23 is interrupted or grounded for any reason, even though the axes of coils 22 and 30 are at right angles to each other. It also provides pull-off torque in case of power failure. The pull-off torque produced by magnet 57 is always present and must be taken into consideration when the instrument is calibrated. It should be suitably proportioned in relation to the other torques to provide a satisfactory scale distribution and range. This auxiliary pull-off torque device 57 is the subject matter of my copending application, Serial No. 517,419, filed January 7, 1944. In the cup shield casing 56 and in damping material 55 opposite the gap in the pull-off magnet 57, there is an opening such as shown at 59. By loosening screws, one of which is shown at 60, in a hub 61 on shaft 25, the magnets of the armature 26 may be removed through the opening 59 to facilitate assembly and disassembly of the receiver. When the top bracket 62 with its upper bearing 63 is removed and the magnets of the armature 26 are removed, the shaft 25 and hub part 61 may be lifted out. Access may then be had to the upper stator element by removing a nut 64. The cup shield 56 is held in place by one or more screws 65. When the cup casing 56 is removed, access may be had to the lower bearing 66, the pull-off magnet 57, and, by removing a nut 67, the lower stator element with the core 24a.

Figure 6:
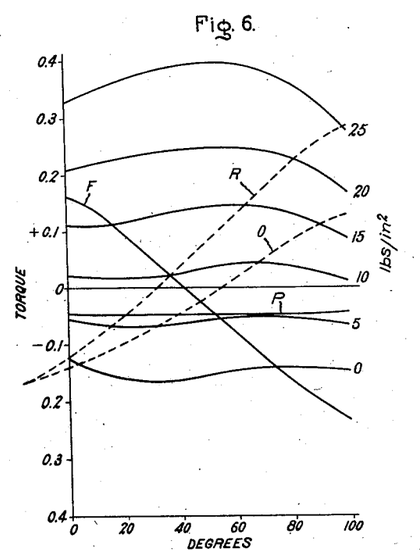
Fig. 6 shows torque deflection curves characteristic of my invention.

In Fig. 6, I have shown torque deflection curves characteristic of the receiver shown in Fig. 5. The substantially straight line curve marked P having a value of about −0.05 at all deflections represents the substantially constant downscale torque produced by the pull-off magnet 57 acting on the permanent magnet armature 26 of Fig. 5. The substantially straight line curve marked F which has a positive value or upscale value at zero scale deflection and a negative value or downscale value at full 100-degree scale deflection, represents the torque which is due to the fixed vector generator existing between the armature 26 and the lower stator element having the core 24a. The dotted line curve R is the algebraic sum of the fixed vector torque F and the pull-off torque P, but plotted reversed so that intersections with the transmitter torque curves are equilibrium points. The generally horizontal curves marked on the right with the values 0, 5, 10, 15, 20 and 25 lb./in.² are the torques in the receiver due to the transmitter, which values of torque occur when the pressures indicated are being measured by the transmitter and which torques exist between the armature 26 and the upper stator element having the core 24. For example, for zero pressure the torque of the upper element of the receiver is downscale and has values for different positions of the armature 26 corresponding to the different angular scale deflections as shown by the curve 0 lb./in.². This downscale torque is equal to the resultant upscale torque R for only one position of the armature and this position corresponds to 0 angle deflection. For 5 lb./in.² the variable torque corresponding to this measurement has a smaller value and is still downscale and is equal to the upscale torque R at about the 14-degree scale point. At 10 lb./in.² pressure in the transmitter the variable torque has reversed in direction due to change in direction of the unidirectional flux in core 41 and is now an upscale torque and is equal and opposite to the resultant torque R at about the 36-degree scale point, etc. Finally, at 25 lb./in.² in the transmitter, this variable torque has increased until it is equal and opposite to the torque R at about the 99-degree scale point.

Another dotted line curve 0 is shown on Fig. 6 which is the torque produced between the top stator element of the transmitter and the armature 26 when the circuit of the measurement coil 23 thereof is interrupted. It is seen that this torque becomes equal to the resultant torque R below the zero point of the degree scale chosen. Hence, if 0 on the degree scale corresponds to zero scale pointer indication, the pointer will move off the low end of the scale in case the telemetering circuit between transmitter and receiver is interrupted.

Figure 10:
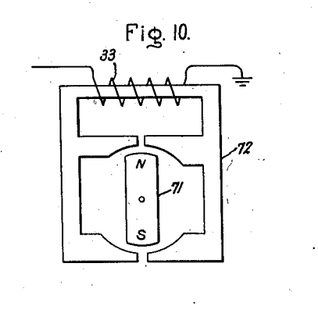
Figs. 10 and 11 represent modified forms of transmitters.

In Fig. 10 there is represented a modified form of transmitter having a single rotary permanent magnet 71 cooperating with a core 72 having the saturable portion on which the transmitter winding 33 is wound. In the position of magnet 71 represented, no unidirectional flux threads the coil 33. Small angular movements of the magnet 71 in opposite directions from the position shown produce unidirectional flux through coil 33 in reverse directions and vary the magnitude thereof.

Figure 11:
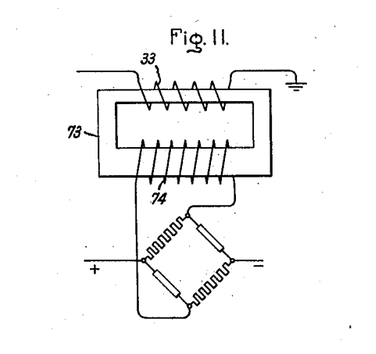

In Fig. 11 there is shown a transmitter having no moving parts. The movable magnet is replaced by a direct current winding 74 on the core 73 having a saturable portion on which the alternating current transmitter coil 33 is wound. The coil 74 is shown connected across a direct current bridge assumed to reverse the direct current in coil 74 as the bridge is unbalanced in opposite directions in response to some measurement.

In accordance with the provisions of the patent statutes, I have described the principle of operation of my invention together with the apparatus which I now consider to represent the best embodiment thereof, but I desire to have it understood that the apparatus shown is only illustrative and that the invention may be carried out by other means.

What I claim as new and desire to secure by Letters Patent of the United States is:

1. A telemetering system of the alternating current saturable core type comprising a receiver having stator and armature means, one comprising saturable core material provided with a plurality of alternating current windings and the other comprising a unidirectional flux magnet in inductive relation to said core means, a transmitter having relatively movable and inductively related saturable core and unidirectional flux producing means, a winding on the saturable core transmitter means connected to one of the windings on the receiver for producing a variable torque in the receiver along one axis in response to relative movement of the transmitter means, and a saturable core means having a winding connected to another winding of the receiver for producing a substantially constant torque in the receiver along another axis, whereby the operation of the receiver is responsive to the resultant of said two torques.

2. A telemetering system comprising a transmitter having relatively movable saturable core and polarized magnet members, a receiver having relatively movable saturable core and polarized magnet members, interconnected alternating current energizing windings on said transmitter and receiver for producing a torque in the receiver along a given axis which varies in magnitude and reverses in direction in response to relative movement of the saturable core and polarized magnet of the transmitter and another saturable core and polarized magnet member, said last-mentioned core and the receiver having interconnected alternating current energizing windings for producing a substantially constant torque in the receiver along an axis at substantially right angles to the first-mentioned axis, whereby the operation of said receiver responds to the resultant of said two torques.

3. A telemetering system comprising a receiver having an annular saturable core and a relatively rotatable magnet for producing a unidirectional flux diametrically of the core, a pair of windings on opposite halves of the core, a transmitter having a saturable magnetic core and means for producing a variable unidirectional flux therethrough in either direction, a winding on the transmitter core connected in series with one of the windings on the receiver core, means for exciting all of said windings with alternating current the series connected windings being excited in series, whereby a torque is produced in the receiver only in the direction of the axis of the windings thereof which varies in magnitude with the variations in unidirectional flux in the transmitter and reverses in direction with reversals in direction of such transmitter flux, and means for producing a substantially constant torque in the receiver in a direction at approximately right angles to said axis.

4. A signaling system comprising a signal receiver comprising a saturable magnetic annular core having only two windings said windings being symmetrically disposed on the two halves of said cores, and a relatively rotatable magnet producing a unidirectional flux diametrically of said core, a signal transmitter comprising a saturable core with a single winding thereon and means for producing a unidirectional flux in either direction through said transmitter core, a signaling circuit connecting the transmitter winding and one of the receiver windings in series and connections for exciting all of said windings from a common source of alternating current, the series connected windings on transmitter and receiver being excited from said source in series, the unidirectional flux in the core of the transmitter producing a torque in the receiver only in the direction of its winding axis which torque reverses in direction with reversals in the direction of the unidirectional flux in the core of the transmitter.

5. A telemetering system comprising a receiver having an annular saturable magnetic core with single windings symmetrically disposed on its two halves and a relatively rotatable magnet for producing a unidirectional flux diametrically of the core and means for producing a substantially constant torque in said receiver tending to align the unidirectional flux axis thereof at substantially right angles to the winding axis thereof, a transmitter having a saturable magnetic core, a winding thereon connected in series with one of the windings of the receiver, means for producing a variable unidirectional flux through the transmitter core, and a source of alternating current energizing all of said windings with the series connected windings energized in series and such that the core members are operated near saturation.

6. A telemetering system comprising a receiver having a stator with a pair of annular saturable magnetic cores and a polarized armature rotatively mounted to produce a unidirectional flux diametrically of such cores, windings on the opposite halves of the two cores the axes of the windings on one core being at approximately right angles to the axes of the windings on the other core, an alternating current source of supply for exciting all of said windings so that the cores operate near saturation and such that the windings on a given core produce fluxes in the core which are in the same direction at any instant, a transmitter having a saturable core and winding therefor which is connected in series with one of the windings of one of the cores of the receiver, and having means for producing a variable and reversible unidirectional flux in such transmitter core, and a fixed vector generator having a saturable core and winding therefor which is connected in series with one of the windings of the other core of the receiver, said fixed vector generator having means for producing a normally constant unidirectional flux in its core.

7. A telemetering system comprising a receiver having an annular saturable core stator member and a polarized magnetic rotor member, a pair of windings on opposite halves of said stator member, a transmitter having a saturable core and a winding thereon connected in series with only one of the windings of the receiver, means in the transmitter for producing a variable unidirectional flux in the transmitter core, means for exciting all of said windings from a source of alternating current such that a varying torque is produced in the receiver tending to align the polarized rotor member to a position parallel with the axis of the winding thereof which is in series with the transmitter winding when the latter winding is threaded with a varying unidirectional flux, means for producing another and substantially constant torque in the receiver tending to rotate the rotor to a position at approximately right angles to the first-mentioned position, a pointer rotated by the receiver, a scale over which said pointer is deflected in response to said two torques, said receiver developing a torque which is effective to move the pointer offscale in case only the excitation of the series connected windings of transmitter and receiver is interrupted.

8. A telemetering system comprising electrically wound transmitters and receivers, said receiver comprising a rotatable armature member, a stator member having a winding in circuit with the wound transmitter for producing a variable receiver torque along one axis, and another wound stator member for producing a normally substantially constant receiver torque along an axis which is at approximately right angles to the first-mentioned axis, a pointer the position of which is determined by the ratio of said torques and a scale over which said pointer is deflected in the normal operation of the system, a common source of supply for both stator winding circuits, one side of which source is grounded and the other side of which is connected to said stator windings through a resistance, and a ground return for said circuits whereby in case the connection between the receiver winding and transmitter is grounded such winding current increases and the current in the other receiver winding decreases thereby producing an offscale torque in the receiver.

9. A telemetering system comprising electrically interconnected transmitters and receivers, a source of supply for energizing said system one side of which is grounded and the other side of which is connected through a resistance, the receiver and the transmitter to ground in the order mentioned, torque producing means in the receiver having a pair of windings one of which is energized over said interconnection and the other of which is energized in parallel therewith and producing a variable receiver torque along a given axis which is proportional to a variable to which the transmitter is responsive, another torque means in the receiver energized from said source through said resistance and normally producing a substantially constant receiver torque along an axis at substantially right angles to the first-mentioned axis, an armature member acted upon in response to the ratio of said torques, a pointer moved by said armature and a scale on which said pointer indicates in the normal operation of the system and a nonelectrical torque device in said receiver tending to move the pointer offscale, said pointer moving offscale in case the connection between transmitter and receiver is opened or grounded or in case the source of supply fails.

10. A telemetering system comprising a receiver having a polarized magnetic armature inductively related to a pair of annular saturable stator core members each having a pair of windings on the two halves thereof, the pair of windings on one core member having their axes at substantially right angles to the winding axes on the other core member, a transmitter having a saturable core magnetic member with a winding thereon connected in series with one of the windings of one of the cores of the receiver, means for producing a unidirectional flux in the transmitter core means for varying the magnitude and direction of such flux, a fixed vector generator comprising a saturable core inductance having a winding connected in series with one of the windings of the other core of the receiver, means for producing a substantially constant but adjustable unidirectional flux through said saturable core inductance, a common source of alternating current supply for all of said windings, said transmitter and said fixed vector generator being compensated for temperature variations such that changes in their temperatures will not influence the saturable core effects which they produce on the alternating currents flowing through their windings.

11. A telemetering system comprising a receiver having a polarized magnetic armature member inductively related to a pair of annular saturable magnetic core members, each core member being provided with a winding on each half, the winding axis of one core member being at approximately right angles to the winding axis of the other core member, a transmitter having a saturable core, a winding thereon connected in series with one of the windings on one of the receiver core members and means for producing a variable and reversible unidirectional flux through the transmitter core, a fixed vector generator having a saturable core containing an air gap, a winding on said core connected in series with one of the windings of the other receiver core members, a permanent magnet adjacent said air gap the position of which magnet is adjustable relative to the gap for the purpose of producing a substantially constant but adjustable unidirectional flux in one direction through the fixed vector generator core, a magnetic material having a negative temperature coefficient of permeability inserted in said air gap for temperature compensating said fixed vector generator, and means for exciting all of said windings with alternating current such that the core parts operate near saturation.

12. A telemetering system comprising a transmitter and a receiver of the saturable core type each having windings, said transmitter comprising a core member in the approximate shape of a hollow rectangle having a gap in one side and the previously mentioned winding about the other side, the winding side having a smaller cross section than the remaining sides, an armature member extending through the core, a pair of permanent bar magnets carried by the armature member one on each side of said core member and parallel and adjacent to the core side containing the gap, said magnets being reversely polarized, means for moving said armature member to inversely vary the spacing between said magnets and the respective core member for the purpose of reversing the unidirectional flux produced in said core by said magnets and varying the amount of such flux, and a source of alternating current supply for energizing the transmitter and receiver windings in series, whereby the influence of the transmitter on the current in its winding is transmitted to the receiver.

13. A telemetering system comprising an interconnected transmitter and receiver of the saturated core type, the transmitter having a casing containing parallel magnetic partitions between which is supported a saturable magnetic core in the general shape of a hollow rectangle having a gap in one side and a winding on the side opposite the gap, the winding side being of reduced cross section as compared to the remaining sides, said core being parallel to said partitions, an armature member movable at right angles to the partitions and core and carrying thereon a pair of bar-shaped permanent magnets parallel to each other and to the core, one being between one partition and the core and the other between the other partition and core, said magnets being spaced from but lying adjacent to and across the gap in said core, said magnets being reversely polarized, the arrangement being such that the flux of the magnets divides between the magnetic partitions and the core, the direction and magnitude of such flux in the core being variable and reversible by movement of the armature member, a winding on the receiver connected in series with the transmitter core winding and a source of alternating current for said windings.

14. A system according to claim 13, in which the position of the transmitter core is adjustable between the partitions and the spacing between the permanent magnets is adjustable.

15. A telemetering system comprising a transmitter and receiver of the saturated core type each having windings, the transmitter having a casing containing parallel magnetic partitions and a saturable magnetic core supported parallel to and between said partitions, an armature member, a pressure sensitive diaphragm within said casing for moving said armature member at right angles to the plane of said core, a pair of bar-shaped permanent magnets carried by said armature member parallel to the core one being between the core and one partition and the other being between the core and the other partition, said magnets being reversely magnetized, the arrangement being such that the flux of the magnets divides between the core and partitions and such that the flux through the core varies in magnitude and direction by movement of said armature member, the previously mentioned winding of the transmitter being on said core and connected in series relation with the receiver core with a source of alternating current, and means for compensating said transmitter for variations in temperature comprising U-shaped pieces of material having negative temperature coefficients of permeability lying against said partitions and surrounding but spaced from the ends of the permanent magnets, there being one about each end of each magnet, said compensators carrying a portion of the flux from the permanent magnets which is diverted through the partitions, the amount of flux carried by the several compensating parts decreasing with temperature rise and with the movement of a magnet away from its adjacent partition.

RICHARD G. JEWELL.